United States Patent
Nakagawa et al.

(10) Patent No.: US 6,568,200 B2
(45) Date of Patent: May 27, 2003

(54) AIR-CONDITIONING SYSTEM FOR A VEHICLE

(75) Inventors: Nobuya Nakagawa, Nishi-kasugai-gun (JP); Hajime Izumi, Hyogo-ken (JP); Tetsuo Tominaga, Hyogo-ken (JP); Toshihisa Kondo, Aichi-ken (JP); Kazuo Ishii, Aichi-ken (JP); Masanobu Futatsuki, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/201,150

(22) Filed: Jul. 24, 2002

(65) Prior Publication Data
US 2003/0019233 A1 Jan. 30, 2003

(30) Foreign Application Priority Data
Jul. 25, 2001 (JP) ......................................... 2001-224568
Sep. 20, 2001 (JP) ......................................... 2001-286966

(51) Int. Cl.$^7$ ................................................. B60H 1/32
(52) U.S. Cl. ........................................... 62/244; 165/42
(58) Field of Search .............................. 62/244; 165/42, 165/43

(56) References Cited
U.S. PATENT DOCUMENTS 4,440,212 A    4/1984   Tanino et al.
6,105,383 A *  8/2000   Reimann et al. ............... 62/244
6,148,904 A   11/2000   Tsunooka et al.
6,311,763 B1 * 11/2001  Uemura et al. ................ 62/244
6,351,961 B1 * 3/2002   Kurokawa et al. ............ 62/244
6,352,102 B1 * 3/2002   Takechi et al. .............. 165/203

FOREIGN PATENT DOCUMENTS

JP    10-250344    9/1998
JP    10-250345    9/1998

* cited by examiner

Primary Examiner—William E. Tapolcai
Assistant Examiner—Mohammad M. Ali
(74) Attorney, Agent, or Firm—Oblon, Spivak, McClelland, Maier & Neustadt, P.C.

(57) ABSTRACT

An air conditioning system for a vehicle is disclosed. The air conditioning system includes a casing, an evaporator, a heater core at a rear side of the evaporator, and a mixing area for mixing a first air bypassing the heater core with a second air flowing through the heater core. The system further includes a partition plate for guiding the second air to the mixing area after the second air flows through the heater core, a foot passage, a defrosting passage, a vent outlet, and a defrosting outlet. The system still further includes a temperature controlling damper for controlling rates of the first air and the second air after the first and second airs flows through the evaporator so as to attain a predetermined final temperature of the air which is discharged into a passenger compartment of the vehicle. The system further includes a vent damper, a foot damper and a defrosting damper.

5 Claims, 8 Drawing Sheets

VENT MODE

FIG. 4

VENT & FOOT MODE

FIG. 5

FOOT MODE

FIG. 6

FOOT & DEFROSTING MODE

FIG. 7

DEFROSTING MODE

AIR-CONDITIONING SYSTEM FOR A VEHICLE

BACKGROUND OF THE INVENTION

1. Field of the Invention

The present invention relates to an air conditioning system for a vehicle, and in particular to an air conditioning system mountable in the rear of a vehicle.

2. Description of the Related Art

A vehicle air conditioning system is mounted within the front of a vehicle, more particularly, within an instrumental panel.

Recently, an air conditioning system has been developed which comprises an integral unit including an evaporator and a heater core. The evaporator is a heat exchanger providing a cooling capability and the heater core is a heat exchanger providing a heating capability. Thereby, the system provides an improved space availability in the lower area or the foot area of a passenger compartment and also a reduction of the manufacturing cost.

Examples of the vehicle air conditioning system of the type having the integrated evaporator and heater core unit are disclosed in Japanese Patent Unexamined Publication Nos. 10-250344 and 10-250345.

The conventional air conditioning system disclosed in Japanese Patent Unexamined Publication No. 10-250345 will be explained with reference to FIG. 8. A conventional air conditioning system 50 includes a casing 50. In the casing 50, there are mounted an air inlet 54 for receiving intake air from the front portion of the vehicle and introducing the air into the system, an evaporator 56 for refrigerating or cooling the introduced air, and a heater core 58 located at the rear under side of the evaporator for heating the cooled air from the evaporator 56. A partition plate 60 is mounted at the rear portion of the heater core 58 in the casing 52. The partition plate 60 guides the air heated by the heater core 58 to a mixing area 62 located at the upper portion of the casing 52 where the heated air is mixed with the air cooled by the evaporator 56.

At the rear portion of the evaporator 56, there are provided a first damper 63 for controlling the rate of the air bypassing the heater core 58, and a second damper 76 for controlling the rate of the air flowing through the heater core 58. Thus, the rates of the cooled air and the heated air can be controlled. A foot passage 66 is provided between the partition plate 60 and a rear wall 52a of the casing 52.

A vent outlet 68 is provided near the mixing area 62 at the upper portion of the casing 52, a defrosting outlet 70 is provided in front of the vent outlet 68, and a foot outlet 72 is provided at the rear lower portion of the casing 52. These outlets 68, 70 and 72 are respectively provided with a vent damper 74, a defrosting damper 76 and a foot damper 78.

The conventional air conditioning system explained above controls openings of the five dampers 63, 64, 74, 76 and 78 so as to provide various modes such as a vent mode, a vent and foot mode, a foot mode, a foot and defrosting mode and a defrosting mode. The air having a desired temperature is discharged from the vent outlet 68, the defrosting outlet 70 and/or the foot outlet 72.

On the other hand, the air conditioning system for a vehicle requires, based on the functions of the outlets and comfortability of passengers, a relationship in which [air temperature of defrosting outlet $(T_{def})$]>[air temperature of foot outlet $(T_{foot})$]>[air temperature of vent outlet $(T_{vent})$].

Figure 8:
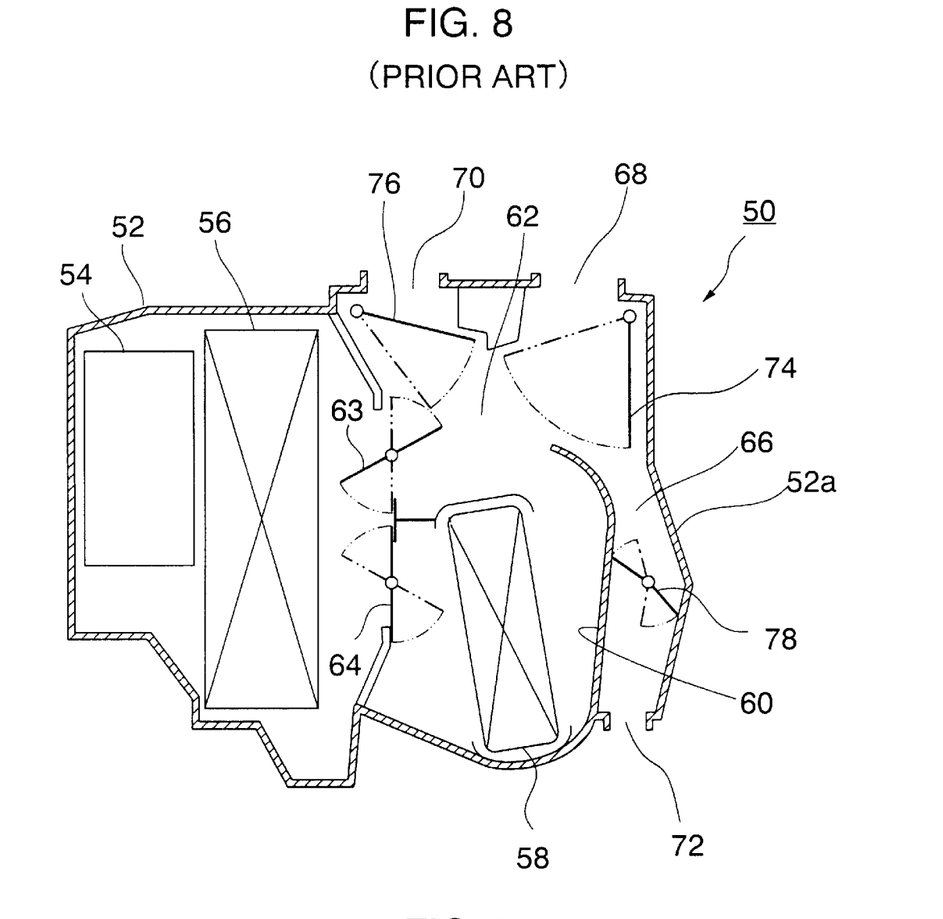
FIG. 8 is a sectional view showing a conventional air conditioning system.

However, in the conventional air conditioning system 50 of FIG. 8, the defrosting outlet 76, the vent outlet 68 and the foot outlet 72 are provided along the casing 52 in turn from the evaporator 56 in the downstream area of the evaporator 53. Namely, the defrosting outlet 76 is the nearest of the these three outlets to the evaporator 56, the foot outlet 72 is the farthest from the evaporator 56 and the vent outlet 68 is located between the defrosting outlet 70 and the foot outlet 72.

Thus, the conventional air conditioning system 50 naturally has a relationship in which [air temperature of foot outlet $(T_{foot})$]>[air temperature of vent outlet $(T_{vent})$]>[air temperature of defrosting outlet $(T_{def})$]. This relationship of the conventional air conditioning system 50 is different from the above-mentioned desired relationship required in the air conditioning system.

In order to overcome this problem and obtain the above-mentioned desired relationship, another type of conventional air conditioning system provided with a larger mixing area and additional unique dampers was developed. However, this type of conventional air conditioning has more complicated structure and a larger size than the previously described one.

Further, the conventional air conditioning system 50 of FIG. 8 has at least three dampers, such as the vent damper 74, the defrosting damper 76 and the foot damper 78, so as to produce various modes. Therefore, if the number of such movable components could be reduced, the reliability of the air conditioning system can be increased.

Figure 9:
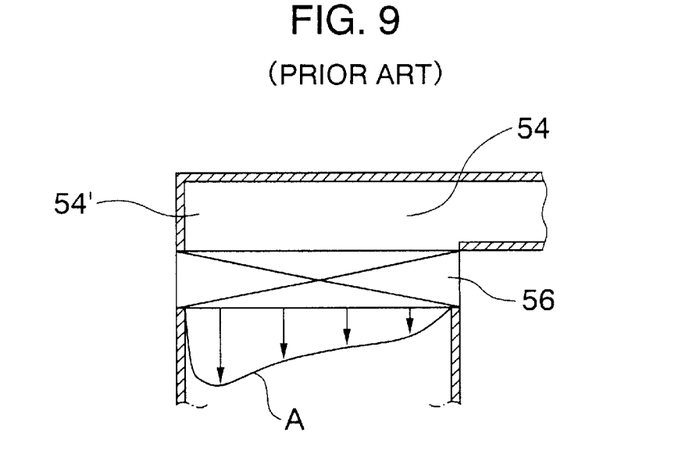
FIG. 9 is a partial plan view showing an evaporator and an air inlet in the conventional air conditioning system.

FIG. 9 is a partial plan view showing the evaporator 56 and the air inlet 54 of the conventional air conditioning system 50 of FIG. 8. As shown in FIG. 9, the air taken from the air inlet 54 is introduced into the evaporator 56 through a passage 54a having a uniform cross section. Therefore, the air flow is concentrated at the downstream side of the passage 54a, and the concentrated air flow is introduced into the evaporator 56 as shown by a symbol "A" in FIG. 9. As a result, the evaporator 56 can not attain its full cooling capability and problems may arise, such that dew is scattered due to the concentrated air flow and the air rates introduced into the right and left sides of the evaporator become different.

SUMMARY OF THE INVENTION

It is therefore an object of the present invention to provide an air conditioning system for a vehicle having a simple structure and a desired relationship of air temperatures in respective air outlets.

It is another object of the present invention to provide an air conditioning system for a vehicle wherein the number of movable components is reduced so as to increase the liability thereof It is still another object of the present invention to provide an air conditioning system for a vehicle wherein air discharged from a blower flows uniformly into an evaporator so as to attain a high cooling capability.

The above objects are achieved according to the present invention by providing an air conditioning system comprising a casing, an evaporator mounted substantially in an upright position at a front portion within the casing, a heater core mounted substantially in an upright position at a rear side of the evaporator, a mixing area located at a rear side of the evaporator and an upper side of the heater core for mixing a first air bypassing the heater core with a second air flowing through the heater core, a partition plate for guiding the second air to the mixing area after the second air flows through the heater core, a foot passage defined by a rear portion of the casing and the partition plate, a defrosting passage communicating with a lower end of the foot passage and being provided along an outer surface of the casing, a vent outlet provided at a portion near the mixing area of the casing, a defrosting outlet provided at an upper end of the defrosting passage, a temperature controlling damper for controlling rates of the first air bypassing the heater core and the second air flowing through the heater core after the first and second airs flow through the evaporator so as to attain a predetermined final temperature of the air which is discharged into a passenger compartment of the vehicle, a vent damper for opening and closing the vent outlet, a foot damper for opening and closing the foot outlet, and a defrosting damper for opening and closing the defrosting outlet.

In a preferred embodiment of the present invention, the foot damper and the defrosting damper are a foot and defrosting damper for opening and closing both the foot outlet and the defrost outlet, the foot and defrosting damper being provided at a portion communicating with both the foot passage and the defrosting passage.

In another preferred embodiment of the present invention, the partition plate has a front portion facing substantially toward the front of the system.

In a still another preferred embodiment of the present invention, the vent outlet, the foot outlet and the defrosting outlet are provided along the casing such that, in the downstream area of the evaporator, the vent outlet is the nearest of the these three outlets to the evaporator, the defrost outlet is the farthest from the evaporator, and the foot outlet is located between the vent outlet and the defrosting outlet.

In still another embodiment of the present invention, the system further comprises a diffuser for guiding air discharged from a blower to the evaporator, the diffuser guiding the air from a lateral side of the evaporator to a front surface of the evaporator, and the diffuser having a cross section which becomes smaller toward the downstream side thereof.

The above object is also achieved according to another aspect of the present invention by providing an air conditioning system comprising a casing, an evaporator mounted in a front portion of the casing, and a diffuser for guiding air discharged from a blower to the evaporator, the diffuser guiding the air from a lateral side of the evaporator to a front surface of the evaporator, and the diffuser having a cross section which becomes smaller toward the downstream side thereof.

The above and other objects and features of the present invention will be apparent from the following description made with reference to the accompany drawings showing preferred embodiments of the present invention.

DETAILED DESCRIPTION OF THE PREFERRED EMBODIMENTS

A preferred embodiment of an air conditioning system for a vehicle according to the present invention will now be described with reference to the accompanying drawings.

Figure 1:
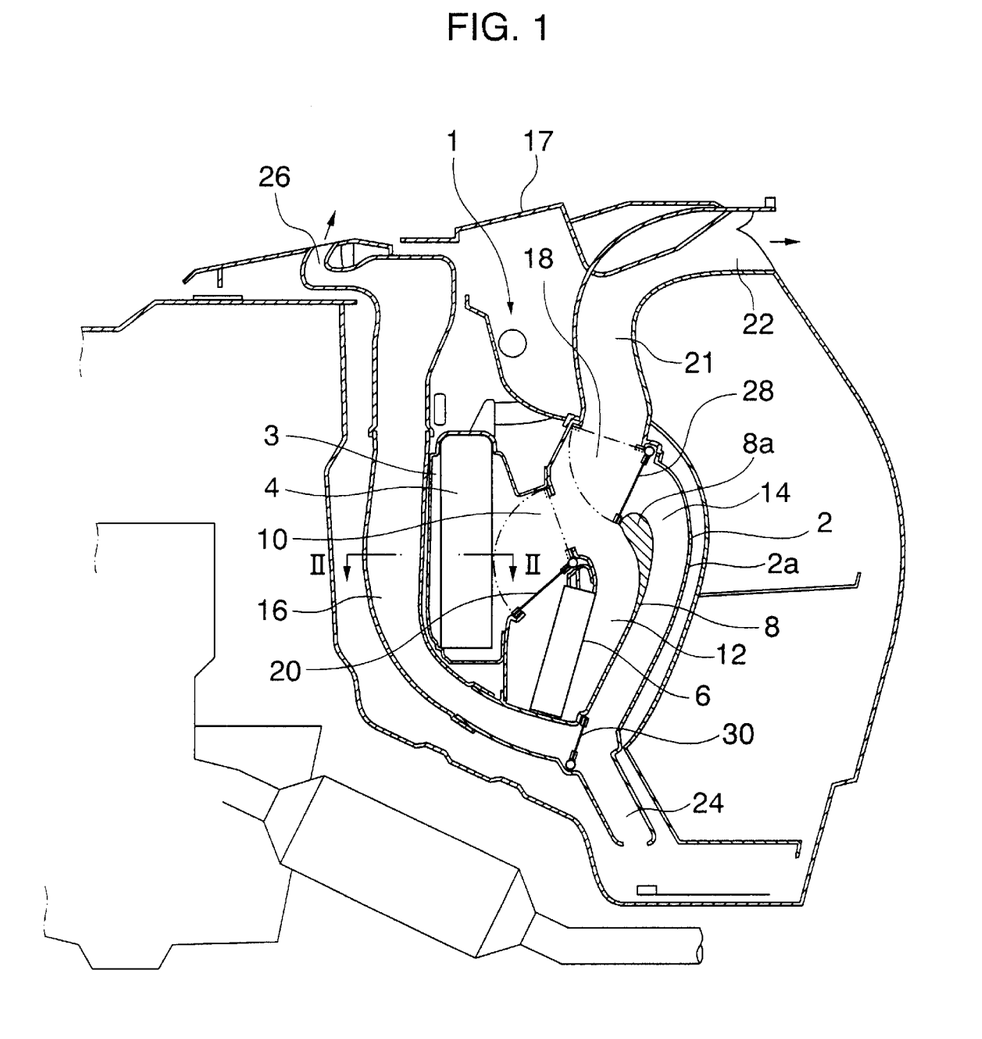
FIG. 1 is a sectional view showing an air conditioning system according to an embodiment of the present invention.

Referring to FIG. 1, a reference numeral 1 designates an air conditioning system for a vehicle according to an embodiment of the present invention. The air conditioning system 1 includes a casing 2. An evaporator 4 working as a heat exchanger providing a cooling function is mounted generally in an upright position in the front upper portion of the casing 2. Air guided by a diffuser 3 is introduced into the evaporator 2. A heater core 6 working as a heat exchanger providing a heating function is mounted generally in an upright position at a lower rear side (a lower downstream side) of the evaporator 4. The air conditioning system 1 further includes a partition plate 8 at a rear side of the heater core 6, an upper end portion 8a of the plate 8 being formed so as to face the front side of the system 1 and to have a streamlined shape.

The air conditioning system 1 further includes a bypass passage 10 which is located at a rear side of the evaporator 4 and bypasses the heater core 6. A heater passage 12 is provided between the heater core 6 and the partition plate 8 at the rear side of the heater core 6, and a foot passage 14 is provided between the partition plate 8 and the rear wall 2a of the casing 2.

Further, a defrosting passage 16 is provided so as to communicate with the lower end of the foot passage 14 and to extend along the outer surface of the lower front side of the casing 2. The defrosting passage 16 is located near the diffuser 3. The reference numeral 17 designates an instrument panel of the vehicle.

Figure 2:
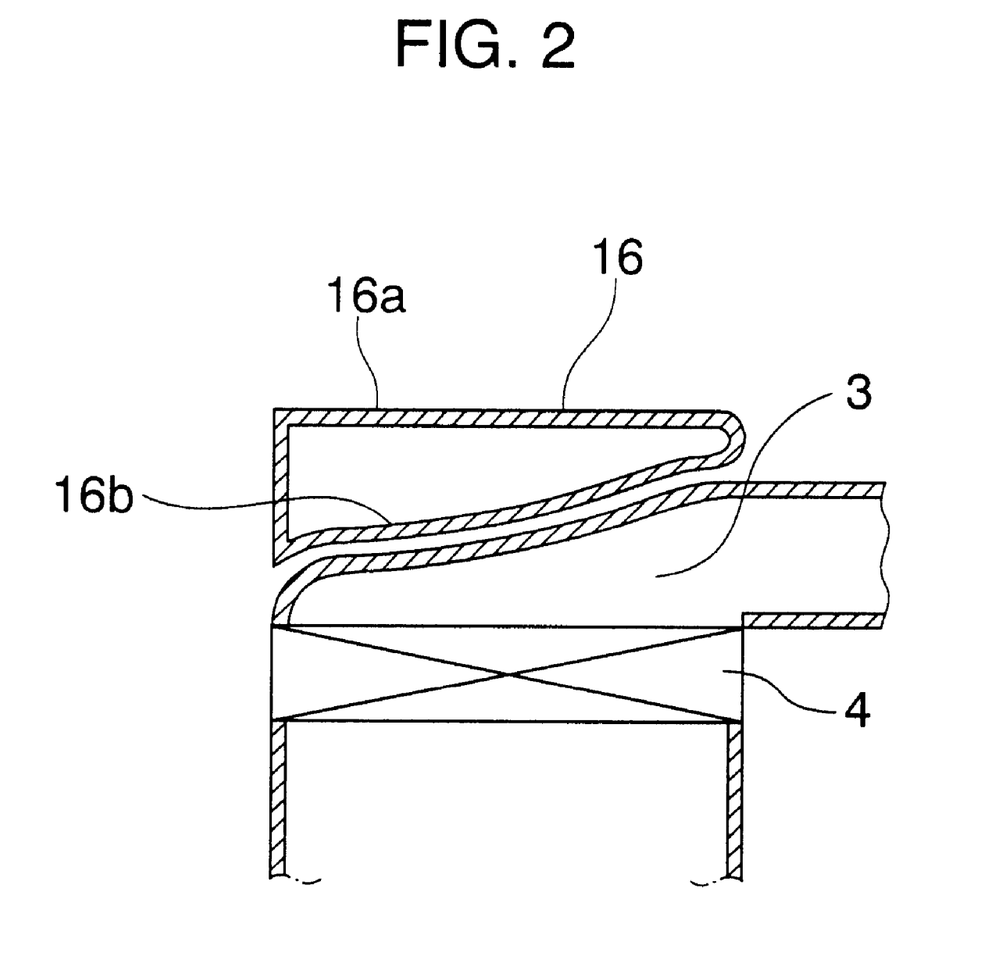
FIG. 2 is a partial plan view showing an evaporator, a diffuser and a defrosting passage taken in a direction of a line II—II in FIG. 1.

Referring to FIG. 2, the diffuser 3 provides a passage extending from the lateral side of the evaporator 4 and communicating with the evaporator 4 at the front surface of the evaporator 4. The cross section of the diffuser 3 becomes gradually smaller from the upstream side to the downstream thereof. A front wall portion 16a of the defrosting passage 16 is generally parallel to the evaporator 4 and a rear wall portion 16b of the defrosting passage 16 is configured so as to correspond to the outer shape of the diffuser 3. Thus, the defrosting passage 16 has a cross section whose one end portion is relatively wide and whose other end portion is relatively narrow in a width direction.

Referring back to FIG. 1, a mixing area 18 is provided at an area of the downstream portion of the bypass passage 10 connected to the upper portion of the heater passage 12. At the mixing area 18, the air cooled by the evaporator 4 and flowing through the bypass 10 is mixed with the air heated by the heater core 6 and flowing through the heater passage 12.

A temperature controlling damper 20 is provided in the bypass passage 10 located at the downstream portion of the evaporator 4. The temperature controlling damper 20 works so as to control the rate of the air bypassing the heater core 6 and the rate of the air flowing through the heater core 6. An opening of the temperature controlling damper 20 can range from 0% (fully closed) to 100% (fully opened). In FIG. 1, a continuous line of the damper 20 shows a fully closed 0% position, and a chain line of the damper 20 shows a fully opened 100% position. The opening of the temperature controlling damper 20 is adjusted by a drive motor (not shown).

A vent passage 21 is provided near the mixing area 18 at the rear upper portion of the casing 2, and a vent outlet 22 is provided at the downstream side of the vent passage 21. A foot outlet 24 is provided at the rear lower end of the casing or the lower end of the foot passage 14. A defrosting outlet 26 is provided at the upper end of the defrosting passage 16.

A vent damper 28 is provided at the vent outlet 22, and a foot and defrosting damper 30 is provided at the foot outlet 24. The foot and defrosting damper 30 is located at a portion of the foot passage 14 connected to the defrosting passage 16 and works as both a foot damper and a defrosting damper. Therefore, a separate defrosting damper does not need to be provided.

On the other hand, according to the embodiment of the present invention, a foot damper and a defrosting damper may be respectively provided. In this case, the defrosting damper needs to be provided at the defrosting outlet.

An operation of the embodiment of the air conditioning system according to the present invention will be described below.

As shown in FIG. 1, the vent outlet 22, the foot outlet 24 and the defrosting outlet 26 are provided along the casing 2 in turn from the evaporator 4. Namely, the vent outlet 22, the foot outlet 24 and the defrosting outlet 26 are provided along the casing 2 such that, in the downstream area of the evaporator 4, the vent outlet 22 is the nearest of the these three outlets to the evaporator 4, the defrost outlet 26 is the farthest from the evaporator 4 and the foot outlet 24 is located between the vent outlet 22 and the defrosting outlet 26. As a result, according to the embodiment of the present invention, the air conditioning system 1 obtains the desired relationship in which [air temperature of defrosting outlet $(T_{def})$]>[air temperature of foot outlet $(T_{foot})$]>[air temperature of vent outlet $(T_{vent})$].

Further, since the foot and defrosting damper 30 is provided at the portion of the foot passage 14 connected to the defrosting passage 16, a separate defrosting damper does not need to be provided. As a result, the damper, which is a movable component, can be deleted.

Moreover, since the upper end portion 8a of the partition plate 8 is curved so as to face toward the front of the system 1, the air heated by the heater core 6 can be supplied to a much more upstream portion of the mixing area 18. As a result, the mixing of the heated air and the cooled air at the mixing area 18 is promoted and therefore the mixing area 18 can be small.

As shown in FIG. 2, since the downstream side of the diffuser 3 has a relatively small cross section, the air flow is not concentrated at the downstream side of the diffuser 3 and therefore the air flows uniformly into the front surface of the evaporator 4. As a result, a cooling capability of the evaporator 4 is improved, the dew can be prevented form being scattered, and the rate of the air discharged from the right and left sides of the evaporator 4 can be made uniform.

As shown in FIG. 2, due to the small cross section of the downstream side of the diffuser 3, a space is created there in which the defrosting passage 16 can be located. As a result, the space needed for the air conditioning system 1 can be generally reduced.

Further, since the defrosting passage 16 is mounted so as to extend from the lower surface of the casing 2 to the front upper surface of the casing 2, the defrosting outlet 26 can be mounted so as to avoid the instrument panel 17.

The structure of the diffuser 3 explained above may be applied to the conventional air conditioning system shown in FIG. 8.

Figure 3:
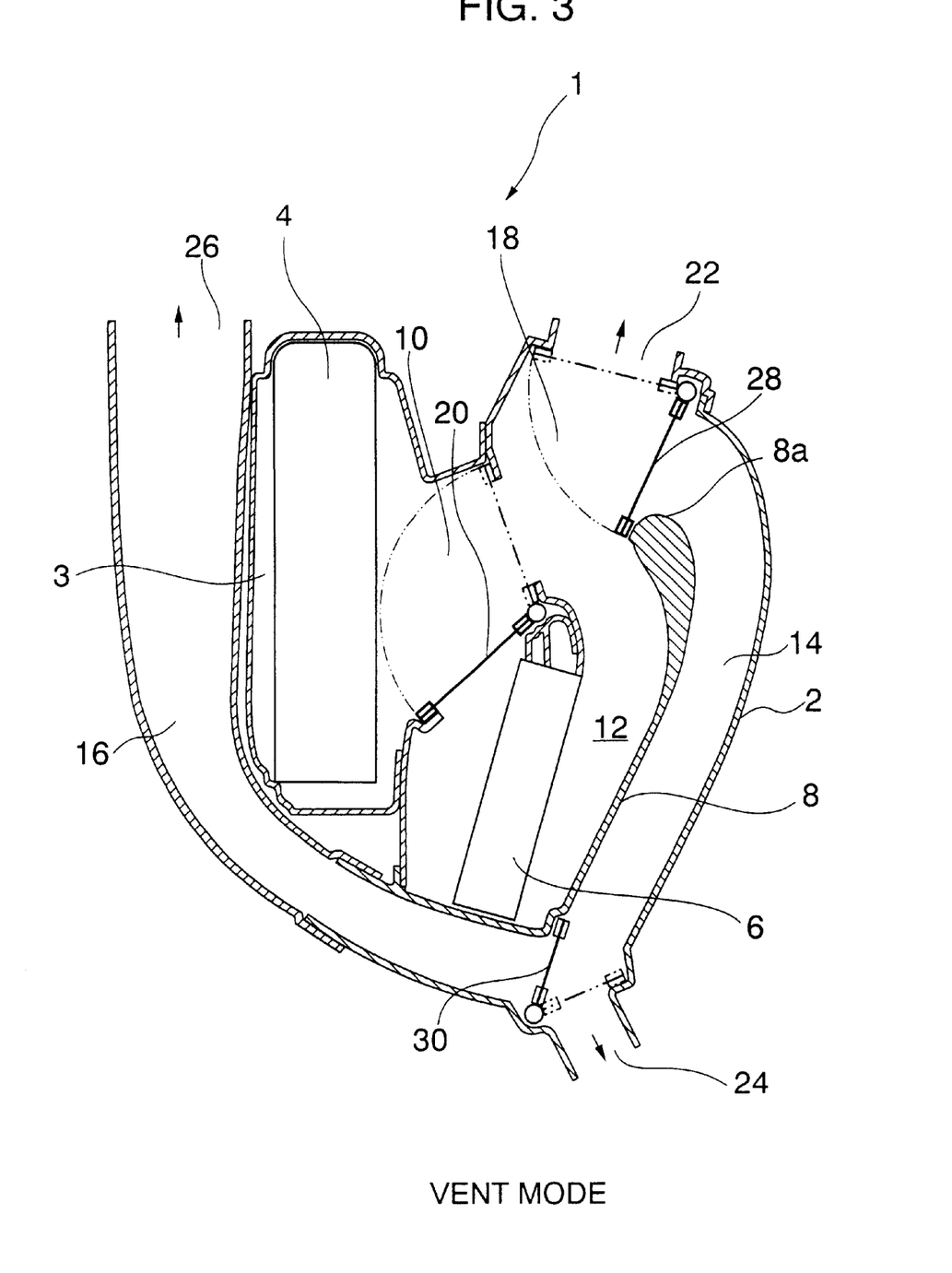
FIG. 3 is a sectional view showing the air conditioning system when it is in a vent mode according to the embodiment of the present invention.

Next, referring to FIG. 3, the operation in the vent mode of the air conditioning system 1 will be explained below. In the vent mode, the air conditioned to have a desired temperature is discharged from the vent outlet 22. In the vent mode, the vent damper 28 is fully opened (a continuous line in FIG. 3 shows a fully opened position of the damper 28) while the temperature controlling damper 20 is opened to have a predetermined opening such that the air having a desired temperature is discharged from the vent outlet 22. In a max cool state of the vent mode, the temperature controlling damper 20 is fully closed (0% opening) as shown by the continuous line of the damper 20 in FIG. 3.

Figure 4:
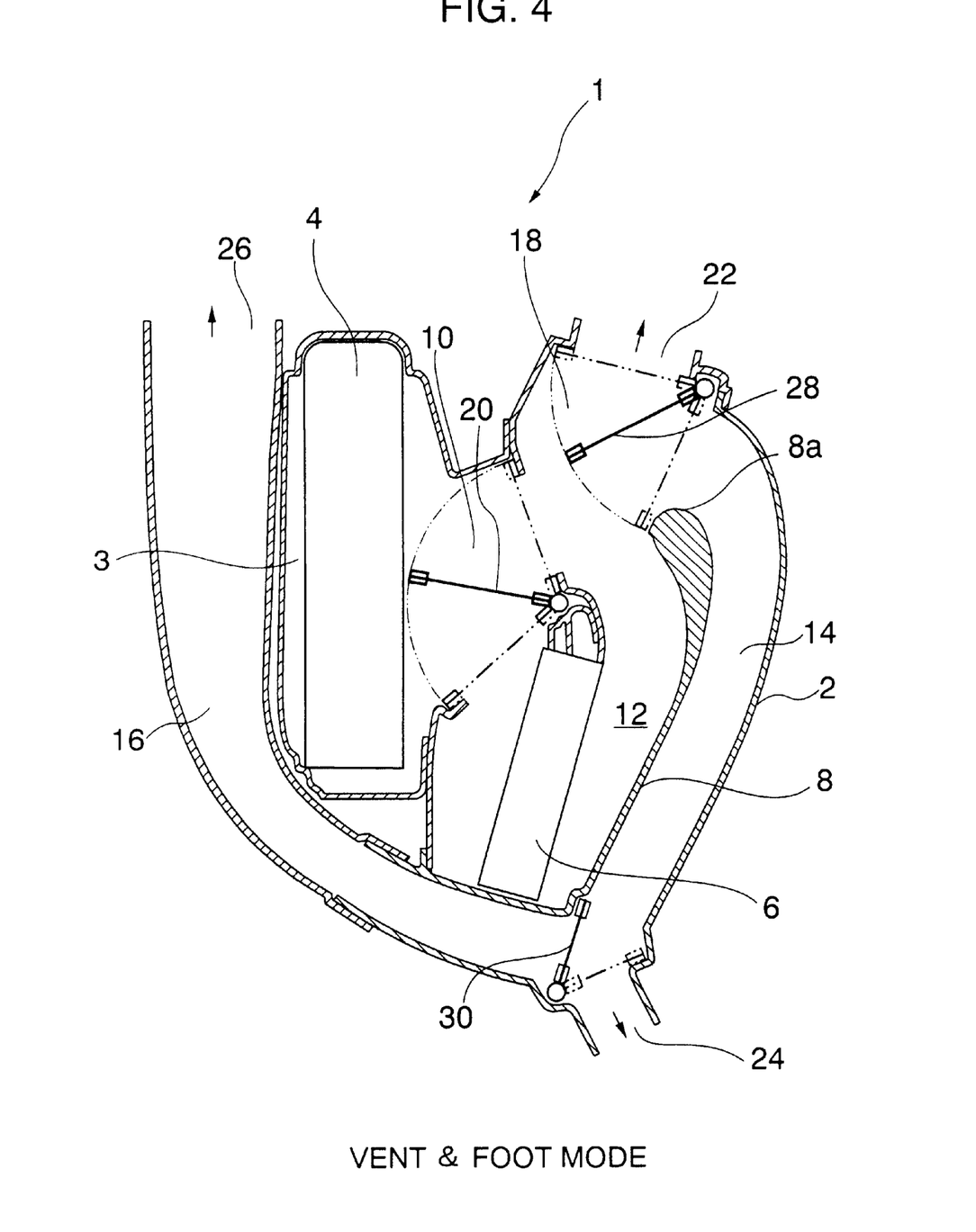
FIG. 4 is a sectional view showing the air conditioning system when it is in a vent and foot mode according to the embodiment of the present invention.

Next, referring to FIG. 4, the operation in the vent and foot mode of the air conditioning system 1 will be explained below. In the vent and foot mode, the cooled air is discharged from the vent outlet 22 and the heated air is discharged from the foot outlet 24. The vent and foot mode is also called the bi-level mode. In the vent and foot mode, the vent damper 28 is opened to have a predetermined opening as shown by a continuous line of the damper 28 in FIG. 4, the foot and defrosting damper 30 is fully opened as shown by a continuous line of the damper 30, and the temperature controlling damper 20 is opened to have a predetermined opening. As a result, one portion of the air cooled by the evaporator 4 flows through the bypass passage 10 and then is mixed at the mixing area 18 with one portion of the heated air from the heater core 6, and the air having a relatively low temperature is discharged from the vent outlet 22. On the other hand, the remaining portion of the air cooled by the evaporator 4 is heated by the heater core 6 and then flows through the heater passage 12 to the mixing area 18. The heated air is then mixed in the mixing area 18 with one portion of the cooled air from the evaporator 4 which flows through the bypass passage 10 and the mixed air then flows through the foot passage 14. The air having a relatively high temperature is discharged from the foot outlet 24.

Figure 5:
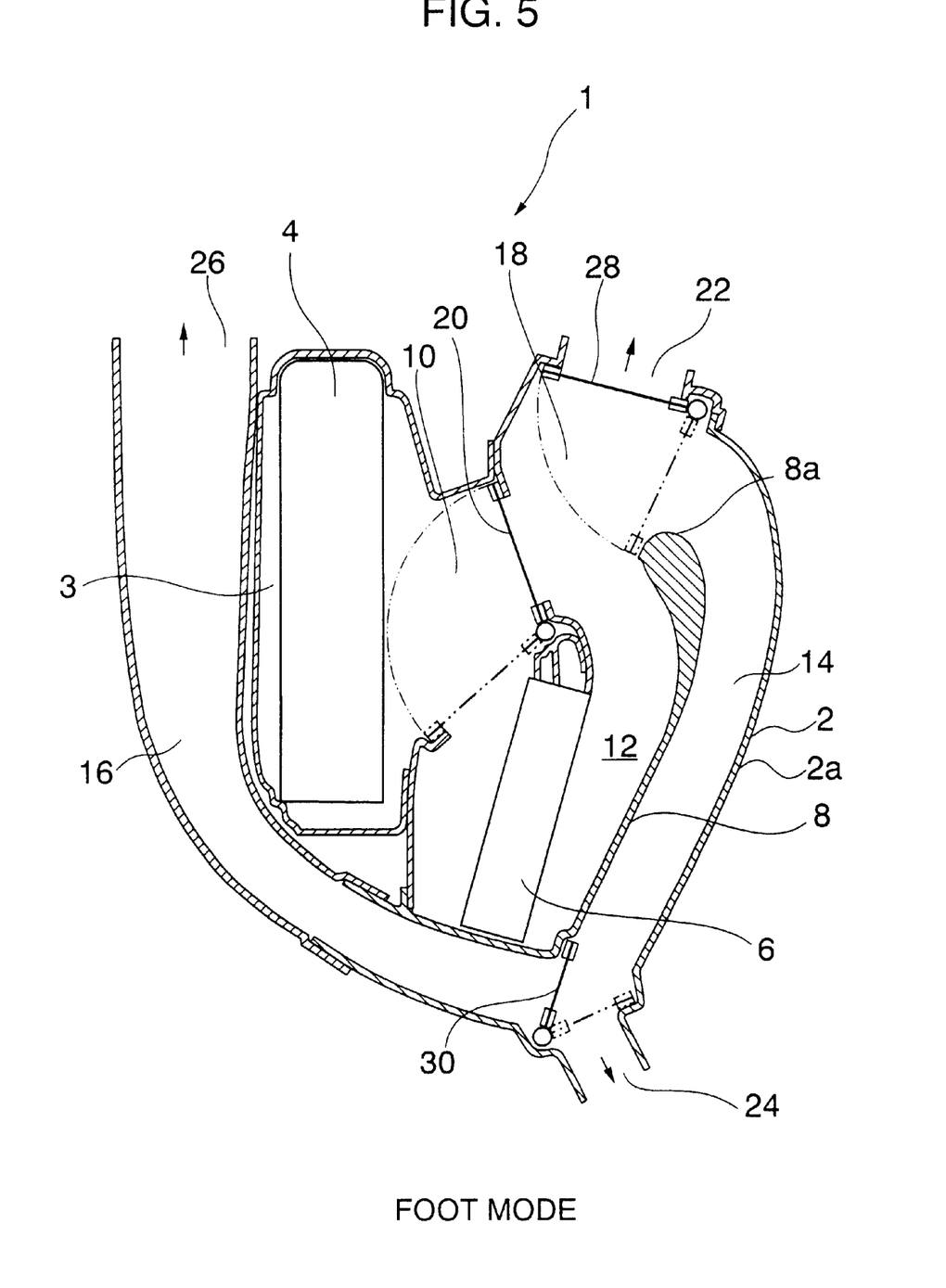
FIG. 5 is a sectional view showing the air conditioning system when it is in a foot mode according to the embodiment of the present invention.

Next, referring to FIG. 5, the operation in the foot mode of the air conditioning system 1 will be explained below. In the foot mode, the air conditioned to have a desired temperature is discharged from the foot outlet 24. In the foot mode, the vent damper 28 is fully closed (a continuous line in FIG. 5 shows a fully closed position of the damper 28), the foot and defrosting damper 30 is fully opened (a continuous line shows a fully opened position of the damper 30), and the temperature controlling damper 20 is opened to have a predetermined opening such that the air having a desired temperature is discharged from the foot outlet 24. In a max heated state of the foot mode, the temperature controlling damper 20 is fully opened (100% opening) as shown by the continuous line of the damper 20 in FIG. 5.

Figure 6:
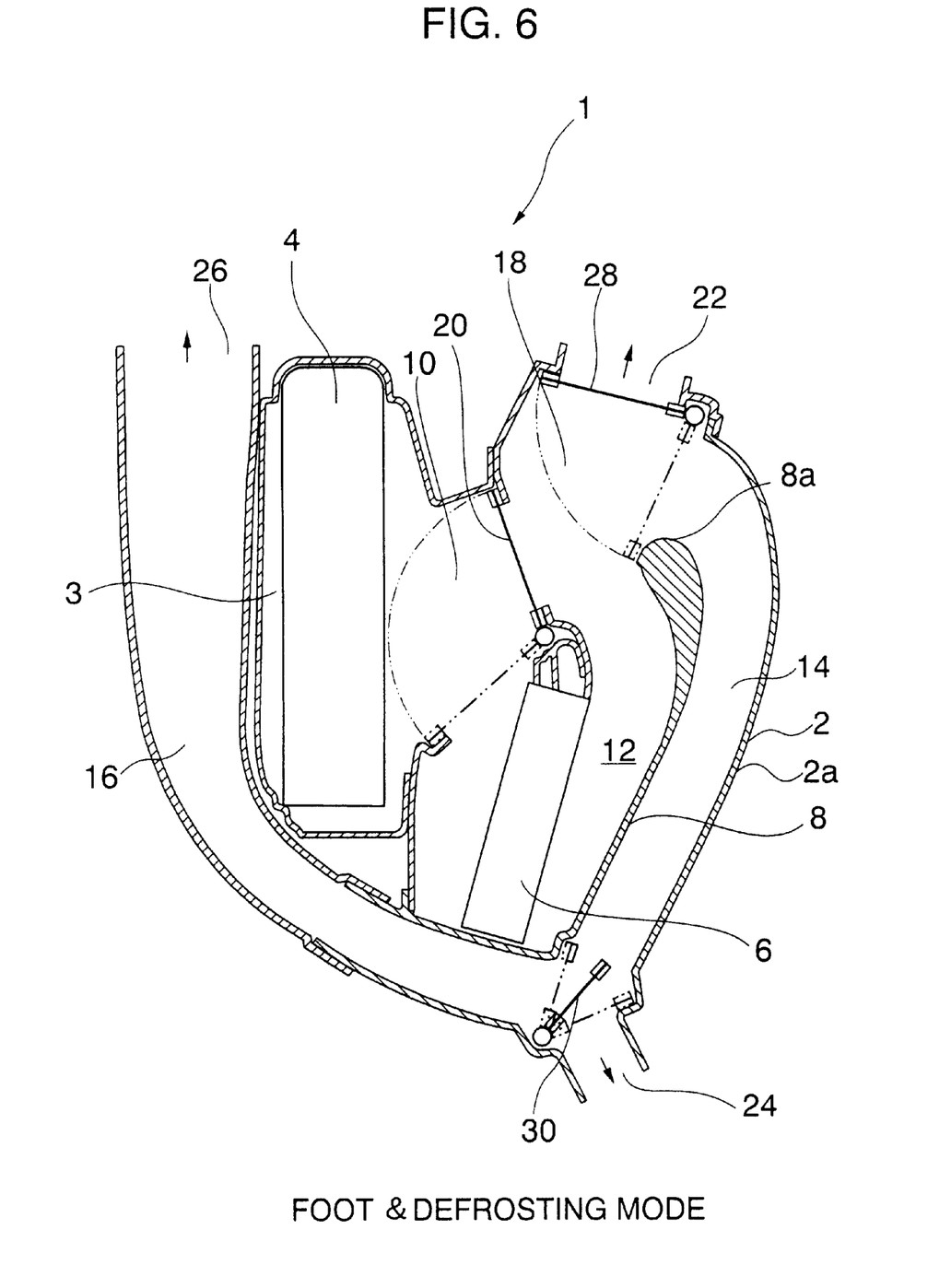
FIG. 6 is a sectional view showing the air conditioning system when it is in a foot and defrosting mode according to the embodiment of the present invention.

Next, referring to FIG. 6, the operation in the foot and defrosting mode of the air conditioning system 1 will be explained below. In the foot and defrosting mode, the air having a relatively high temperature is discharged from the foot outlet 24 and the defrosting outlet 26. In the foot and defrosting mode, the vent damper 28 is fully closed (a continuous line in FIG. 6 shows a fully closed position of the damper 28), the foot and defrosting damper 30 is half opened (a continuous line shows a half opened position of the damper 30), and the temperature controlling damper 20 is opened to have a predetermined opening such that the air having a desired temperature is discharged from the foot outlet 24 and the defrosting outlet 26. As a result, the air which is cooled by the evaporator 4 and flows through the bypass passage 10 is mixed at the mixing area 18 with the air which is heated by the heater core 6 and flows through the heater passage 12, so that the air having a desired temperature flows through the foot passage and one portion of the air is discharged from the foot outlet 24 and the remaining portion of the air is discharged from the defrosting outlet 26. In a max heated state of the foot and defrosting mode, the temperature controlling damper 20 is fully opened (100% opening) as shown by the continuous line of the damper 20 in FIG. 6.

Figure 7:
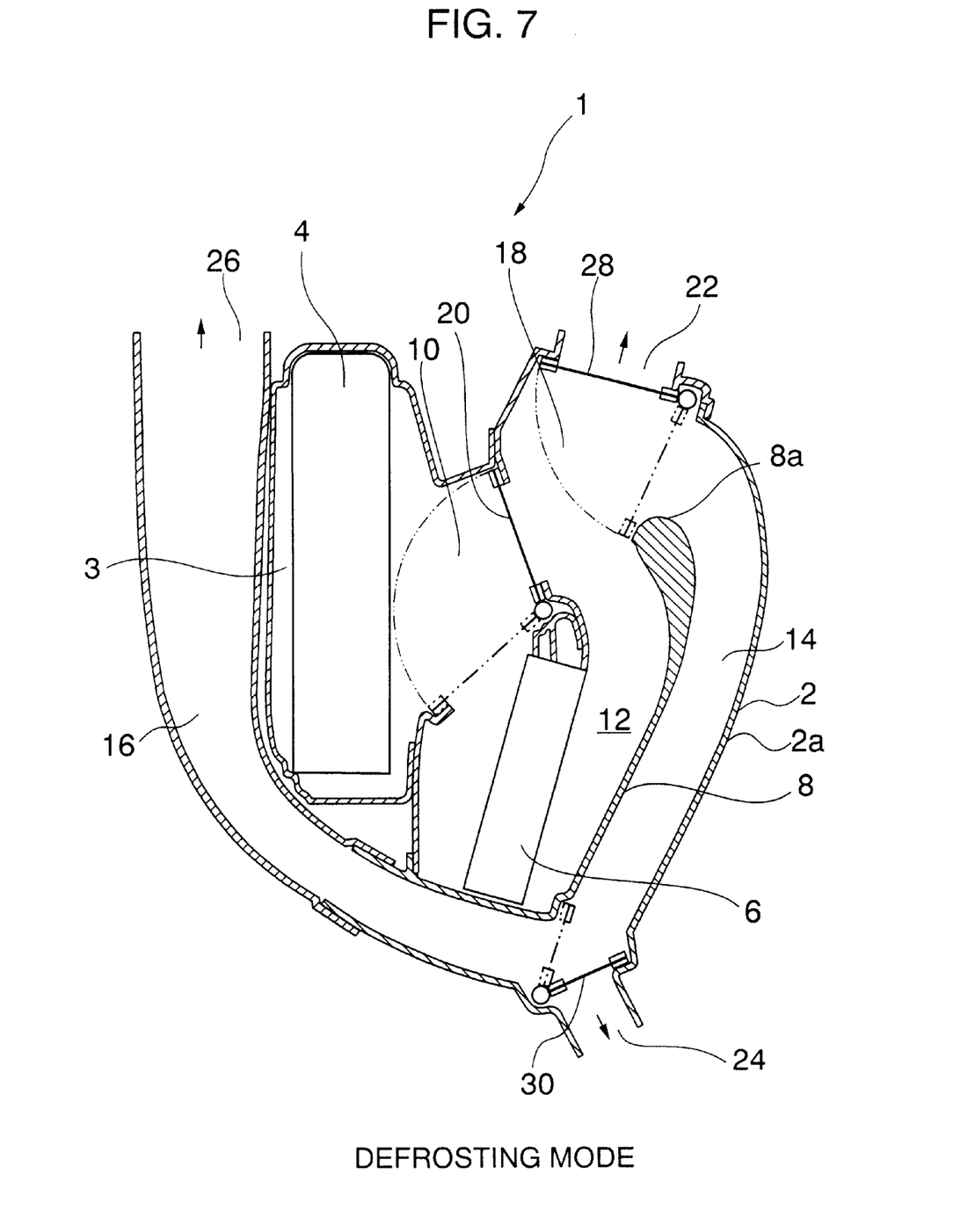
FIG. 7 is a sectional view showing the air conditioning system when it is in a defrosting mode according to the embodiment of the present invention.

Next, referring to FIG. 7, the operation in the defrosting mode of the air conditioning system 1 will be explained below. In the defrosting mode, the air conditioned to have a desired temperature is discharged from the defrosting outlet 26 so that condensation on a front glass of the passenger compartment is removed. In the defrosting mode, the vent damper 28 and the foot and defrosting damper 30 are both fully closed (continuous lines in FIG. 6 shows the respective fully closed positions of the dampers 28 and 30), and the temperature controlling damper 20 is opened to have a predetermined opening so that the air having a desired temperature is discharged from the defrosting outlet 24. In a max heated state of the foot mode, the temperature controlling damper 20 is fully opened (100% opening) as shown by the continuous line of the damper 20 in FIG. 6.

Although the present invention has been explained with reference to specific, preferred embodiments, one of ordinary skill in the art will recognize that modifications and improvements can be made while remaining within the scope and spirit of the present invention. The scope of the present invention is determined solely by the appended claims.

What is claimed is:

1. An air conditioning system for a vehicle comprising:
   a casing;
   an evaporator mounted substantially in an upright position at a front portion within the casing;
   a heater core mounted substantially in an upright position at a rear side of the evaporator;
   a mixing area located at a rear side of the evaporator and an upper side of the heater core for mixing a first air bypassing the heater core with a second air flowing through the heater core;
   a partition plate for guiding the second air to the mixing area after the second air flows through the heater core;
   a foot passage defined by a rear portion of the casing and the partition plate;
   a defrosting passage communicating with a lower end of the foot passage and extending along an outer surface of the casing to the upper portion of the casing;
   a vent outlet provided at a portion near the mixing area of the casing;
   a defrosting outlet provided at an upper end of the defrosting passage;
   a temperature controlling damper for controlling rates of the first air bypassing the heater core and the second air flowing through the heater core after the first and second airs flow through the evaporator so as to attain a predetermined final temperature of the air which is discharged into a passenger compartment of the vehicle;
   a vent damper for opening and closing the vent outlet;
   a foot damper for opening and closing a foot outlet for the foot passage; and
   a defrosting damper for opening and closing the defrosting outlet,
   wherein said vent, foot and defrosting outlets are positioned along the casing such that, in the downstream area of the evaporator, the vent outlet is the nearest to the evaporator, the defrost outlet is the farthest from the evaporator, and the foot outlet is located between the vent outlet and the defrosting outlet.

2. An air conditioning system according to claim 1, wherein said foot damper and said defrosting damper are a foot and defrosting damper for opening and closing both the foot outlet and the defrost outlet, the foot and defrosting damper being provided at a portion communicating with both the foot passage and the defrosting passage.

3. An air conditioning system according to claim 1, wherein said partition plate has a front portion facing substantially toward the front of the system.

4. An air conditioning system according to claim 1, wherein the system further comprises a diffuser for guiding air discharged from a blower to the evaporator, the diff-user guiding the air from a lateral side of the evaporator to a front surface of the evaporator, and the diffuser having a cross section which becomes smaller toward the downstream side thereof.

5. An air conditioning system according to claim 4, wherein the defrosting passage is provided so as to face the diffuser and provided with a portion which is configured so as to correspond to the outer shape of the diffuser.

* * * * *